United States Patent
Messick et al.

(10) Patent No.: US 7,586,944 B2
(45) Date of Patent: *Sep. 8, 2009

(54) METHOD AND SYSTEM FOR GROUPING CLIENTS OF A STORAGE AREA NETWORK ACCORDING TO PRIORITIES FOR BANDWIDTH ALLOCATION

(75) Inventors: Randall E. Messick, Boise, ID (US);
Richard L Peterson, Boise, ID (US);
Martin L Ackerman, Boise, ID (US);
Michael Eugene Lutz, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1470 days.

This patent is subject to a terminal disclaimer.

(21) Appl. No.: 10/233,230

(22) Filed: Aug. 30, 2002

(65) Prior Publication Data

US 2004/0042489 A1    Mar. 4, 2004

(51) Int. Cl.
*H04J 3/16*    (2006.01)
*G06F 15/16*   (2006.01)

(52) U.S. Cl. ....................... 370/468; 709/219

(58) Field of Classification Search ................. 370/468; 709/219

See application file for complete search history.

(56) References Cited

U.S. PATENT DOCUMENTS

| | | | |
|---|---|---|---|
| 5,687,167 A * | 11/1997 | Bertin et al. | 370/254 |
| 6,104,705 A * | 8/2000 | Ismail et al. | 370/260 |
| 6,343,324 B1 | 1/2002 | Hubis et al. | |
| 6,421,723 B1 | 7/2002 | Tawil | |
| 6,651,125 B2 * | 11/2003 | Maergner et al. | 710/244 |
| 6,947,987 B2 * | 9/2005 | Boland | 709/226 |
| 7,031,720 B2 * | 4/2006 | Weerakoon et al. | 455/452.2 |
| 2002/0059408 A1 * | 5/2002 | Pattabhiraman et al. | 709/223 |
| 2002/0091722 A1 | 7/2002 | Gupta et al. | |
| 2002/0174227 A1 * | 11/2002 | Hartsell et al. | 709/226 |
| 2003/0069972 A1 * | 4/2003 | Yoshimura et al. | 709/226 |
| 2003/0076849 A1 * | 4/2003 | Morgan et al. | 370/412 |
| 2003/0125034 A1 * | 7/2003 | Weerakoon et al. | 455/450 |
| 2004/0015602 A1 * | 1/2004 | Goldhammer et al. | 709/235 |

* cited by examiner

*Primary Examiner*—Andrew Lee

(57) ABSTRACT

A method for managing bandwidth allocation in a storage area network includes preparing a policy that defines access parameters for two or more groups of client devices that are grouped according to priority in accessing network resources.

36 Claims, 7 Drawing Sheets

METHOD AND SYSTEM FOR GROUPING CLIENTS OF A STORAGE AREA NETWORK ACCORDING TO PRIORITIES FOR BANDWIDTH ALLOCATION

FIELD OF THE INVENTION

The present invention relates to the field of data storage. More particularly, the present invention relates to allocating the bandwidth of I/O paths in a storage area network to provide appropriate bandwidth to respective groups of clients arranged according to priority.

BACKGROUND OF THE INVENTION

The use of computers and computer networks pervade virtually every business and other enterprise in the modern world. With computers, users generate vast quantities of data that can be stored for a variety of purposes. This storehouse of data can grow at a phenomenal pace and become critically valuable to those who have generated it. Consequently, there is an ever-present need for data storage systems that improve on capacity, speed, reliability, etc.

In a single computer, the primary data storage device is usually a hard drive with a storage capacity measured in gigabytes. Additionally, computers may store data using such devices as CD-ROM drives, floppy disk drives, tape drive, etc. Within a computer network, the computers of the network may also store data on network servers or other data storage devices, such as those mentioned above, that are accessible through the network. For larger systems with even greater data storage needs, arrays of data storage disks may be added to the network.

Storage Area Networks (SANs) are an emerging technology being implemented to accommodate high-capacity data storage devices, particularly disk arrays, within a network. A SAN is essentially a high-speed network between client devices, such as servers and data storage devices, particularly disk arrays. A SAN overcomes the limitations and inflexibility of traditional attached data storage.

A SAN can overcome the limitations of traditional attached data storage but also introduces new considerations. For example, a SAN typically includes a complex network of servers and storage devices that can be difficult to manage, particularly for optimal performance. In particular, SANs experience competition for resources when more than one client is attempting to access the same data storage device. A typical storage device has a limited amount of bandwidth in its Input/Output (I/O) paths and this bandwidth must be shared among the clients accessing the storage device.

SUMMARY OF THE INVENTION

In one of many possible embodiments, the present invention provides a method for managing bandwidth allocation in a storage area network that includes preparing a policy that defines access parameters for two or more groups of client devices that are grouped according to priority in accessing network resources.

BRIEF DESCRIPTION OF THE DRAWINGS

The accompanying drawings illustrate various embodiments of the present invention and are a part of the specification. Together with the following description, the drawings demonstrate and explain the principles of the present invention. The illustrated embodiments are examples of the present invention and do not limit the scope of the invention.

Throughout the drawings, identical reference numbers designate similar, but not necessarily identical, elements.

DETAILED DESCRIPTION OF EMBODIMENTS OF THE INVENTION

Embodiments of the invention include a method for managing bandwidth within a Storage Area Network (SAN). According to one exemplary embodiment, described more fully below, an innovative method includes grouping client devices in the network according to priority. A group of clients with a higher priority will preferentially receive bandwidth within the network as compared with a group of clients with a lower priority. When new clients are added to the network, it is not necessary to identify that client specifically or its bandwidth needs. Rather, the client can simply be assigned to an existing priority group. The application managing access to the storage device or devices in the network can implement the priority groups and treat them appropriately by applying a governing policy.

In the following description, for purposes of explanation, numerous specific details are set forth in order to provide a thorough understanding of the invention. It will be apparent, however, to one skilled in the art that the invention can be practiced without these specific details. Reference in the specification to "one embodiment" or "an embodiment" means that a particular feature, structure, or characteristic described in connection with the embodiment is included in at least one embodiment of the invention. The several appearances of the phrase "in one embodiment" in various places in the specification are not necessarily all referring to the same embodiment.

Figure 1:
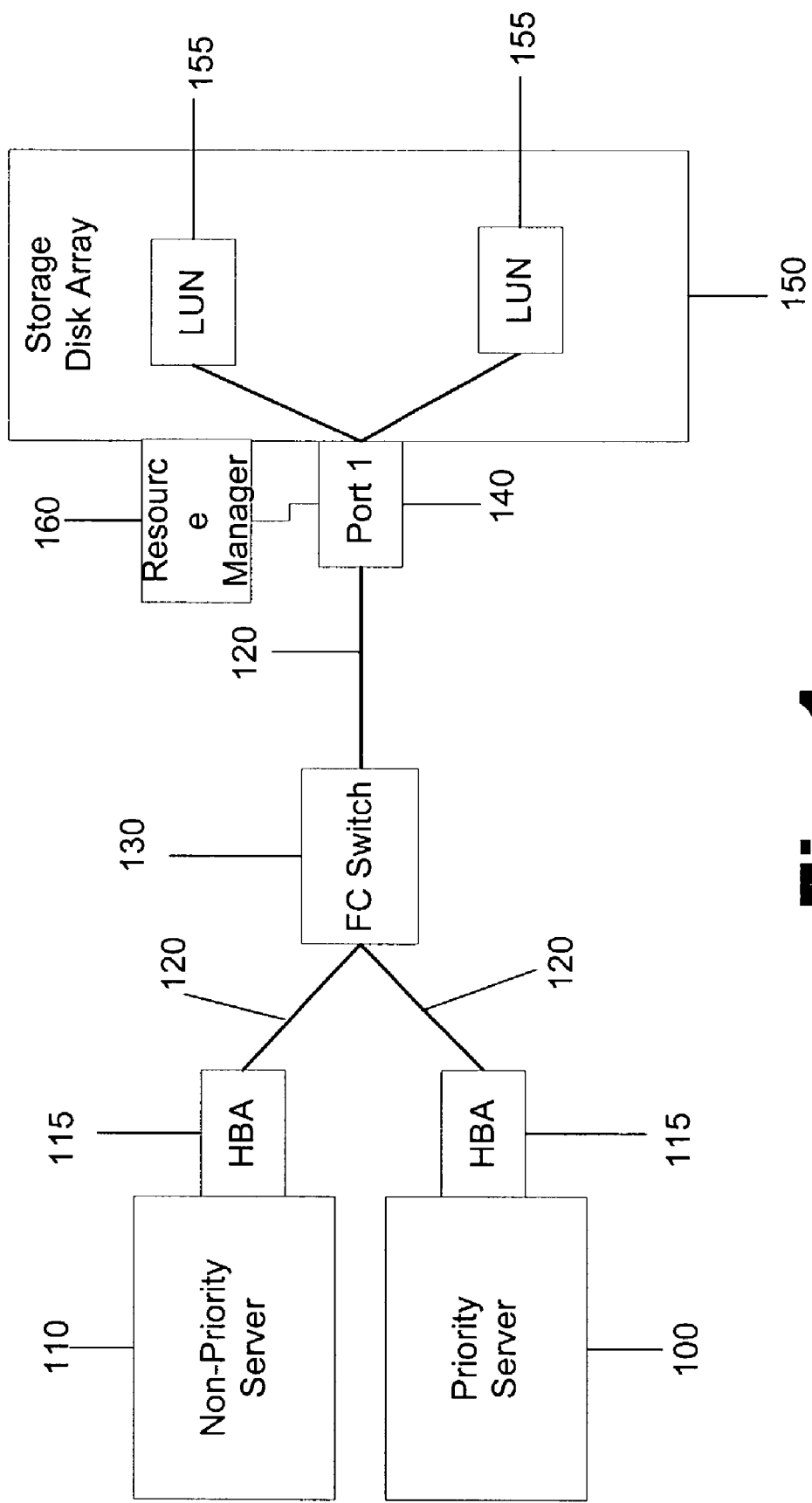
FIG. 1 is a block diagram illustrating an embodiment of the present invention in which clients of different priorities are given different amounts of access to the resources of a data storage device.

Storage area networks vary in size and complexity, and are flexible in their configurations for meeting the storage needs of a network. A simplified storage area network configuration is depicted in FIG. 1 to illustrate the transfer of data between a limited number of devices interfaced with a storage area network. More complex storage area networks may interface with any number of devices as needed to meet a given user's storage needs.

FIG. 1 illustrates a data retrieval system according to one embodiment of the present invention. As shown in FIG. 1, an embodiment of a data retrieval system includes a number of servers or host computers (100, 110), referred to collectively as "clients." As demonstrated in FIG. 1, data retrieval systems may assign a different priority to each client within the data retrieval system, as illustrated by the priority server (100) and the non-priority server (110). Each server is communicatively coupled to a Host Bus Adapter (HBA) (115) which is in turn coupled to a communication line (120).

The communication line (120) that couples the servers (100, 110) to the storage disk array (150) is preferably a fibre channel loop compliant with the "Fibre Channel Physical and Signaling Interface" ((FC-PH) Rev. 4.3, X3T11, Jun. 1, 1994 standard, American National Standards for Information Systems), which standard is hereby incorporated by reference. Each device on the loop (120), by virtue of the fiber channel host bus adapter, has a unique identifier referred to as its world wide name (WWN). The present invention may also use any unique identifier associated with the servers (100, 110) so long as that identifying means is unique for each device among the interconnected devices.

Continuing in the direction of the communication line (120), the line (120) is fed into a fibre channel switch (130). The switch (130) continues on to a port (140) of the storage disk array (150).

In computing systems, storage disk arrays (150) divide the storage into a number of logical volumes. These volumes are accessed through a logical unit number (LUN) (155) addressing scheme as is common in SCSI protocol based storage systems, including SCSI protocol based, fibre channel loop, physical layer configurations. The term LUN refers to a logical unit or logical volume, or, in the context of a SCSI protocol based device or system, to an SCSI logical unit or SCSI logical volume.

Those of ordinary skill in the art will appreciate that the number of physical disk drives may be the same as, or different from, the number of logical units or logical volumes. However, for the sake of simplicity and clarity, we use these terms interchangeably here, focusing primarily on logical volumes as compared to the physical disk drives that make up those logical volumes.

The storage disk array (150) also contains a resource manager (160). The resource manager (160) contains software or firmware that enables the resource manager (160) to identify each server (100, 110) accessing the storage array (150) and to allot I/O bandwidth at the port (140) to each such server (100, 110) as specified by the software.

Figure 2:
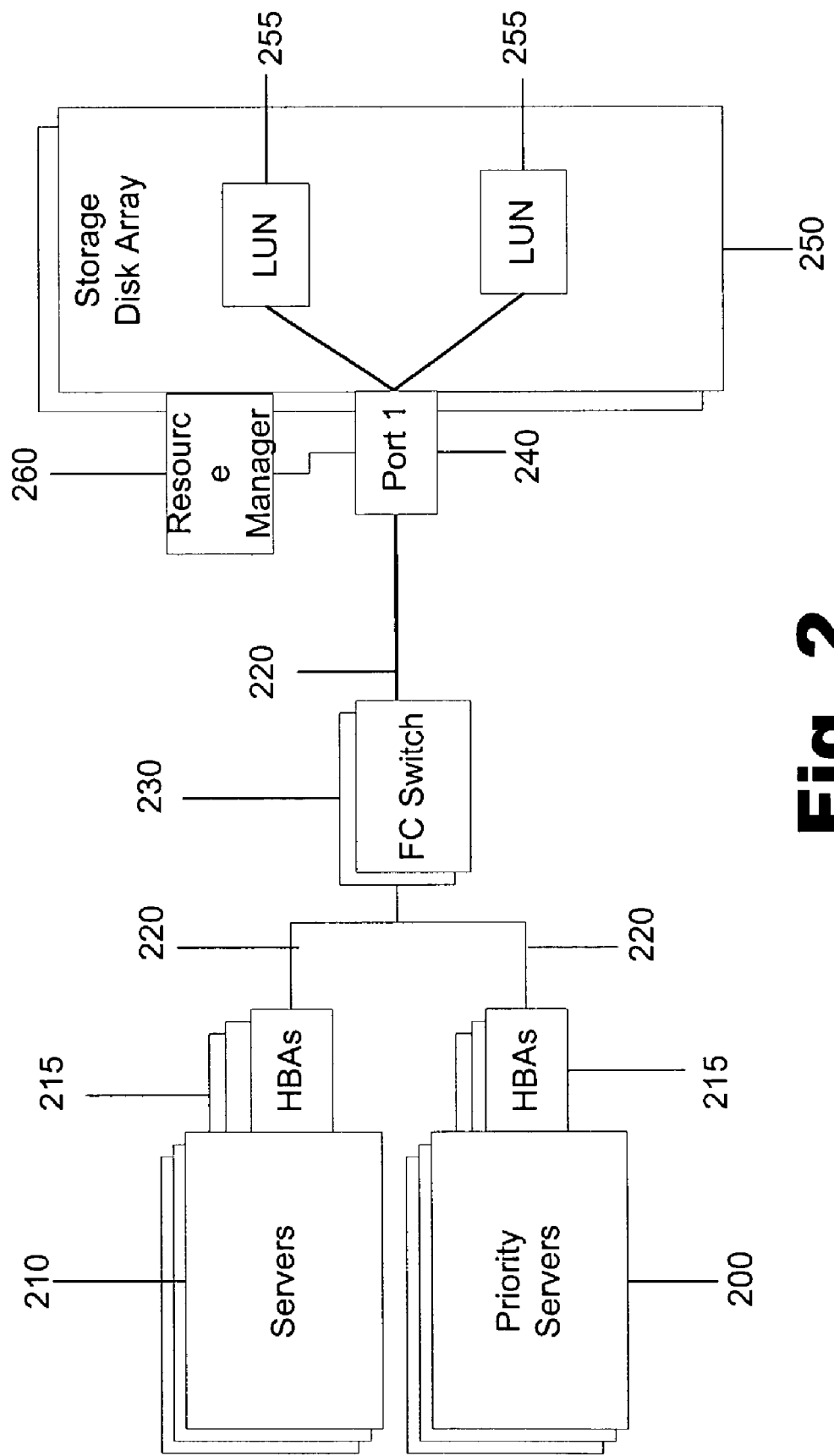
FIG. 2 is a block diagram illustrating another embodiment of the present invention in which clients of different priorities are given different amounts of access to the resources of the data storage devices of a SAN.

FIG. 2 illustrates an additional configuration. As shown in FIG. 2, a number of servers (200, 210) may be connected via a fibre channel loop (220) to a plurality of FC switches (230) leading to a plurality of storage disk arrays (250) that are communicatively coupled to the network through the switches (230). It will be appreciated by those of ordinary skill in the art that the present invention may be practiced with a number of configurations without varying from the teachings of the present invention.

As mentioned earlier, SANs experience competition for resources when more than one client is attempting to access the same data storage device. A typical storage device has a limited amount of bandwidth in its I/O paths and this bandwidth must be properly apportioned out to the clients accessing the storage device. An I/O path is the path from the client's Host Bus Adapter (HBA), over a Storage Network, to a block of storage on a storage device (e.g. a disk array) (250). In order to properly allocate the bandwidth, the system recognizes that the client systems are not all of the same priority, i.e., in order to optimize the operation of the overall system, some clients need more I/O performance and bandwidth from the storage devices (250) than do other clients. In order to maximize the performance of the system, the maximum storage device performance available for lower priority client systems shouldn't impact the storage device performance available to higher priority clients.

The resource manager (260) is a product that monitors the I/O performance and bandwidth usage of the storage system, and sets performance caps based on user-established policies. Under principles of the present invention, that policy preferably distinguishes between priority groups of clients and directs the resource manager (260) to treat higher priority groups of clients preferentially in bandwidth allocation.

Figure 3:
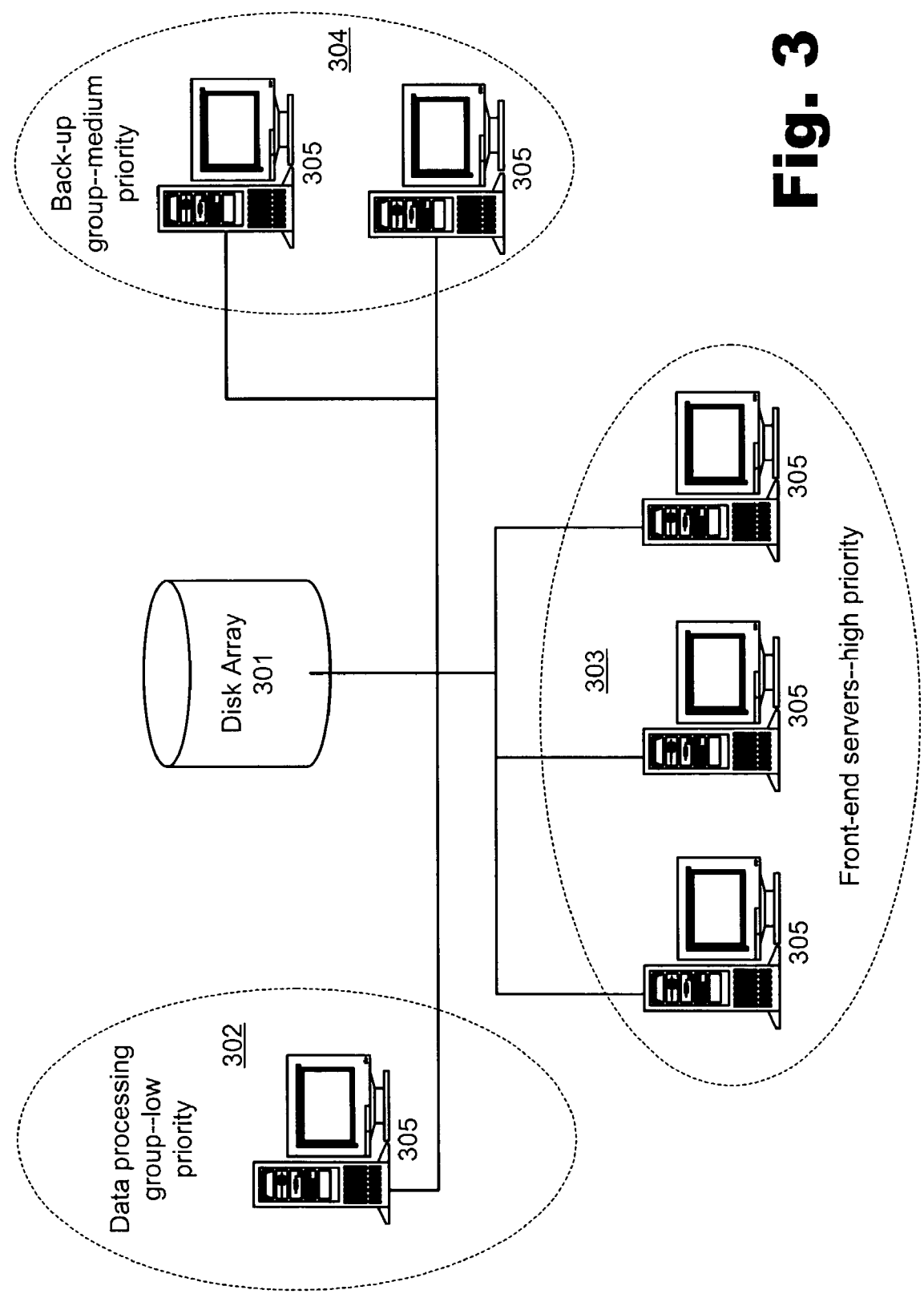
FIG. 3 is a block diagram illustrating an embodiment of the present invention which clients of a SAN are divided into priority groups and given different amounts of access to network resources based on the group to which each belongs.

FIG. 3 illustrates a network in which a number of distributed clients (305) make use of the data storage resources of a single disk array (301). Under principles of the present invention, these clients are grouped, as shown in FIG. 3, according to the priority they should receive in the allocation of access to the resources of the disk array (301).

For example, one group (303) may include front-end servers that provide user interface with the network. Because users are interfacing directly with these clients, the group (303) should be given the highest priority when accessing the resources of the disk array (301). A second group (304) may include the servers that are dedicated to providing data backup for the network. This group (304) may be given second or medium priority when accessing the resources of the disk array (301). Finally, another group (302) may include clients that are dedicated to data processing. This group (302) may be given the lowest priority when accessing the resources of the disk array (301).

Based on the groupings shown in FIG. 3, a resource manager for the disk array (301) can give preferential access to the array to any higher priority group as compared to a lower priority group. This will help optimize the operation of the network.

Moreover, when a new client is added to the network, it is not necessary to specifically identify that client and its need for access to the disk array (301). Rather, the new client can simply be added to an existing priority group and will then be given the same access to the disk array as other clients in that group. This makes it easier to expand and manage the network as needed.

Figure 4:
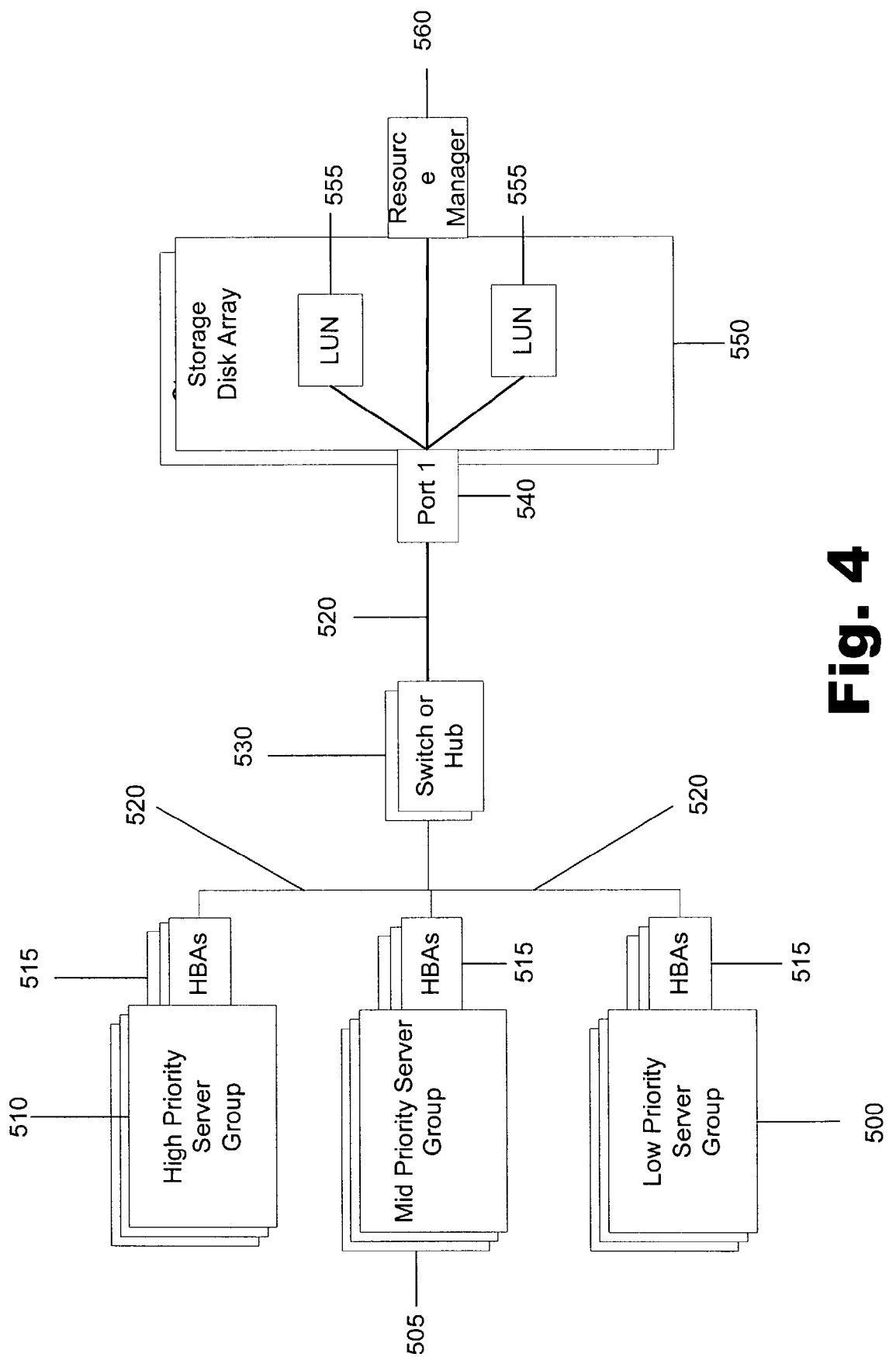
FIG. 4 is a block diagram illustrating another embodiment similar to that of FIG. 3.

FIG. 4 illustrates a network similar to that of FIG. 3 with additional details. In FIG. 4, a group of high priority clients (510) are connected by host bus adapters (515) to a storage array (550) through a fibre channel connection (520), a switch or hub (530), a connection (520) and a port (540). A group of medium priority clients (505) and a group of low priority clients (500) are similarly connected to the storage array (550).

Figure 5:
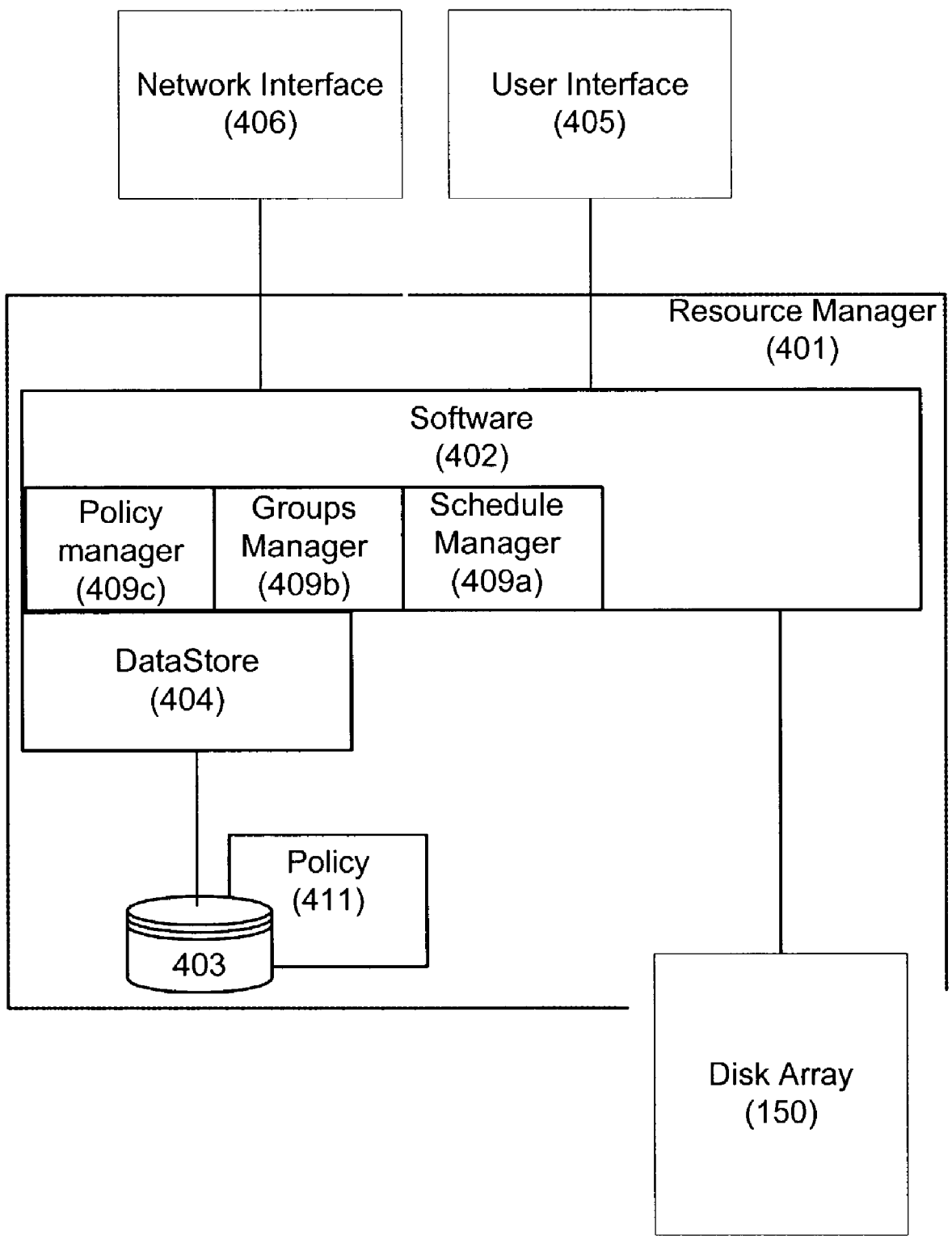
FIG. 5 is a block diagram of an embodiment of a resource manager according to principles of the present invention as used in the systems illustrated in, for example, claims 1-3.

FIG. 5 is a block diagram illustrating a possible embodiment of a resource manager according to the present invention that treats groups of clients differently in allocating the resources of a SAN. As shown in FIG. 5, the resource manager (401) executes a piece of firmware or software (402). This software (402) communicates with the rest of the SAN through a network interface (406). The network interface (406) may include a port or ports of a storage device that includes the resource manager (401) and disk array (150).

A user interface (405) may also be communicating with the software (402) so that the user can control the operation of the resource manager (401). This may include defining the policy that handles groups of client devices differently when allocating access to the resources of the disk array (150) or other storage device. The user interface (405) may include a Java Applet within a web browser resident on a client device. This client device can be located anywhere on the user's intranet and preferably communicates with the resource manager (401) using web-based protocols.

Within the software (402) are a number of managers (409). The group manager (409b) allocates client devices into priority groups. The client devices can be allocated to a group by WWN or another identifier, by a particular port used to connect the client device to the storage device, or by the I/O path between the client and the storage device. After creating a group, the group can be managed with a single policy.

The policy manager (409c) is used to create and execute a policy (411) that defines what access preferences will be given to each group of client devices for accessing the resources of the storage device, e.g., the disk array (150). The policy (411) is then stored in a database (403) of the resource manager (401). The policy (411) is read into a data store (404) of the software (402) as needed. The database (403) can also contain configuration information as well as array performance data.

Because the needs of different client devices may be time-dependent, the software (402) preferably includes a schedule manager (409a). Often computer systems have periodic spurts of activity or schedules on which they operate. Events such as nightly backups or daytime merchant hours affect the quantity of I/O traffic and the required quality of service. In order to maximize the efficiency of bandwidth resources, the present invention allows the policy allocating access to the storage resources to be time dependent corresponding to predicted spurts of activities. Consequently, the schedule manager (409a) can be used to create a schedule for the policy (411) that dictates when the policy or certain portions of the policy will be enforced.

Additionally, the software (402) could comprise a report manager (not shown). The report manager would provide functionality for gathering and displaying performance data, graphing the results, and exporting the data.

One aspect of the present invention concerns the ability to set an upper limit or cap and a minimum threshold on bandwidth usage for each group of clients and have those parameters recorded in the governing policy (411). The cap limits the amount of bandwidth a client or group of clients may use at any one time. The minimum threshold establishes a minimum level of performance below which the user-defined policies, i.e., the caps, are relaxed. There are a number of ways to administer caps and thresholds, including, but not limited to, assigning a cap and/or threshold to each port, to each client/array port pair, or to each client/array LUN pair.

Figure 6:
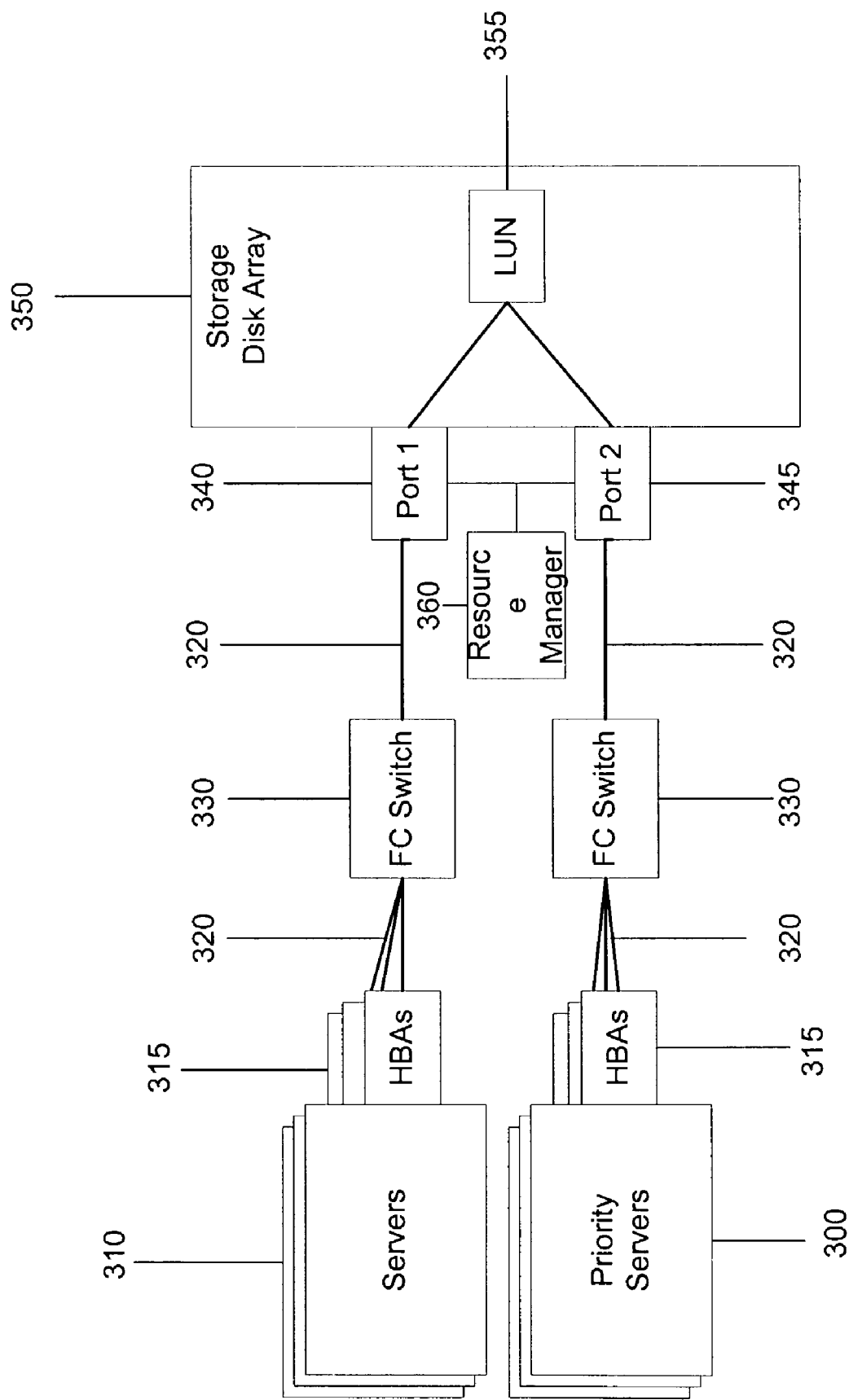
FIG. 6 is a block diagram of another embodiment of a SAN according to the present invention in which clients are grouped according to priority.

FIG. 6 illustrates an embodiment of the present invention that bases the threshold and cap on a port. When multiple I/O paths cross the same piece of hardware (e.g. an array port), contention may occur. The path between each client and the storage disk array (350) is considered a separate I/O path here. By allowing one I/O path (non-priority) to be throttled or capped above a certain performance level, the other I/O path (priority) can be allowed to use the extra I/O on the Port. Thus, utilization of the I/O path is optimized. This concept can be expanded out to a very large Storage Network, but can get difficult to manage. By grouping servers into priority categories (Groups), a single setting can be made to all servers in a category automatically.

In FIG. 6, the clients (300, 310) have been grouped into priority groups: priority servers (300) and ordinary servers (310). Each group has a number of HBAs (315) connecting the respective groups to the fibre channel loop (320) leading to a switch (330). Each switch (330) leads to a port (340, 345) for each server group. Port 1 (340) is dedicated to the group of ordinary clients (310) and port 2 (345) is dedicated to the priority clients (300).

By providing independent ports to each respective group of clients, the resource manager (360) can allocate bandwidth resources to each port in proportion to the importance of the corresponding client group. By assigning a cap and a threshold quantity to each port, the bandwidth can be efficiently distributed. By way of example only, if the logical unit (355) of the storage disk array (350) can only handle 7,000 input and output operations per second (IOPS), port 1 (340) may be capped at 2,000 IOPS. By setting the cap at 2,000 IOPS for port 1 (340), all the servers attached to port 2 (345) can access the remaining 5,000 IOPS associated with the logic unit (355). Accordingly, port 2 may be capped at 5,000 IOPS. By assigning a threshold equal to the aforementioned cap at port 1 (340) and port 2 (345), the bandwidth resources can be dynamically managed. If, by way of example only, port 1 (340) had a threshold of 2,000 IOPS and activity at port 1 (340) drops below that threshold, the cap assigned to port 2 (345) is subsequently released allowing the servers (300) associated with port 2 (345) to make use of the unused bandwidth.

The embodiment demonstrated in FIG. 6 may also be implemented using a single high priority client and a single regular priority client. In this embodiment, a single port (340, 345) is associated with each client. A cap may be implemented on one or both clients through the corresponding port (340, 345) with the residual bandwidth available to the client associated with the other port. Just as indicated above, a threshold may be implemented on either or both of the ports (340, 345). If the activity at one of the ports (340, 345) drops below the threshold assigned it, the assigned cap at the other port is subsequently released to allow the second client make use of the unused bandwidth.

Figure 7:
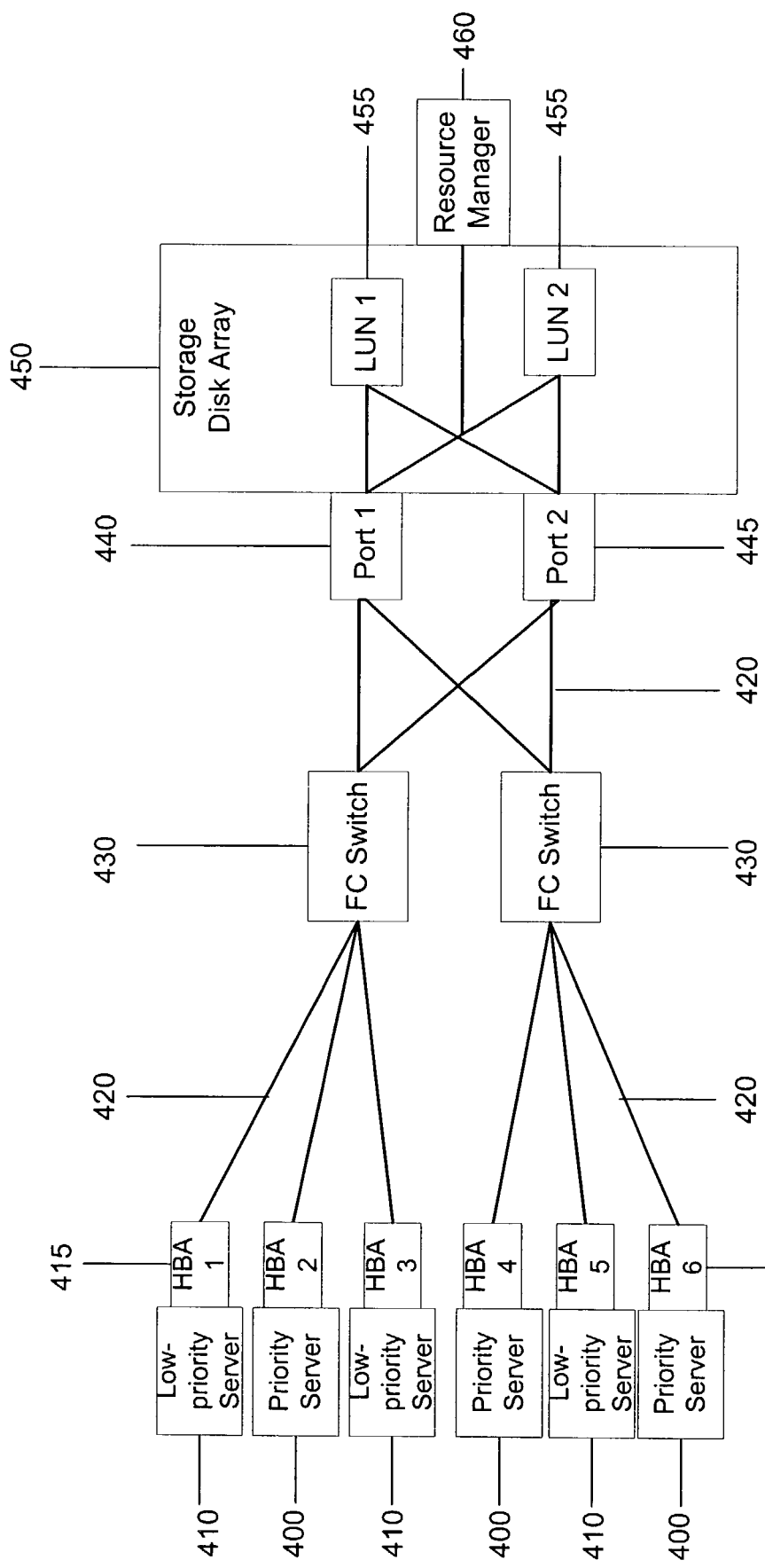
FIG. 7 is a block diagram of another embodiment of a SAN according to the present invention in which clients are grouped according to priority.

FIG. 7 illustrates how a cap and threshold may be based upon a client/array port pair. As shown in FIG. 7, clients with different priorities (400, 410) may be commonly linked to the various ports (440, 445) of the storage disk array (450) rather than grouped as in FIG. 6. By virtue of the unique identifier WWN associated with each client, the resource manager (460) can identify which clients (400, 410) are high priority clients (400) and which ones are not (410), i.e., which priority group a client belongs to. By recognizing which HBA (415) is associated with which client (400, 410), the resource manager (460) can place caps and/or thresholds at each port for specific clients based on the policy that defines resource access parameters for the group to which that client belongs.

By way of example only, FIG. 7 illustrates the client/array port pair embodiment of the present invention. If port 1 (440) is "capped" at 500 IOPS for HBAs 1, 3, and 5 only (415), and Port 1 (440) has threshold of 2,000 IOPS then if total activity on Port 1 (440) drops below 2,000 IOPs, the caps for HBAs 1, 3, and 5 (415) are released. If Port 2 (445) is "capped" at 500 IOPS for HBAs 1, 3, and 5 (415) only and Port 2 (445) has threshold of 3,000 IOPS, then if total activity on Port 2 (445) drops below 3,000 IOPs, the caps for HBAs 1, 3, and 5 (415) are released.

Similar to the client/array port pair embodiment of the present invention explained above, the client/array LUN pair embodiment of the present invention uses the resource manager (460) to identify the client (400, 410) requesting bandwidth performance and applying corresponding caps and thresholds to the individual logic unit (455) in the storage disk array (450) rather than the ports (440, 445). The dynamic management of the bandwidth resources is still triggered by a drop in activity below the threshold. However, in this embodiment, the activity is measured at the individual logic unit (455).

This invention allows for a fine level of user control over the threshold settings. By setting a threshold, the array can relax performance caps when they are not needed and, thereby, not unduly restrict the bandwidth available to the capped port, client/array port pairs, or host/LUN pairs. When all of the bandwidth resources are being used, they are distributed according to priority designations. If, however, activity drops below threshold values, caps for each group may be released to allow for a dynamic redistribution of the available resources. The settings can be made in either I/O per second or MB per second.

The preceding description has been presented only to illustrate and describe the invention. It is not intended to be exhaustive or to limit the invention to any precise form disclosed. Many modifications and variations are possible in light of the above teaching.

The foregoing embodiments were chosen and described in order to illustrate principles of the invention and its practical applications. The preceding description enables others skilled in the art to utilize the invention in various embodiments and with various modifications as are suited to the particular use contemplated. It is intended that the scope of the invention be defined by the following claims.

What is claimed is:

1. A method for managing bandwidth allocation between groups of servers in a storage area network (SAN), the method comprising:
   preparing a policy that defines access parameters for two or more groups of servers that are grouped according to priority in accessing network resources; and
   allocating bandwidth resources to the groups of servers so a first group of servers with a first priority preferentially receives bandwidth for processing Input/Output (I/O) requests in the SAN as compared to a second group of servers with a second priority that is lower than the first priority.

2. The method of claim 1, further comprising operating a resource manager in accordance with said policy, wherein said resource manager controls access to said network resources.

3. The method of claim 1, further comprising:
   receiving a plurality of Input/Output (I/O) requests from a plurality of servers;
   determining a priority group to which each of said servers belong; and
   dynamically allocating bandwidth resources to said plurality of servers based on the priority group to which said plurality of servers belongs.

4. The method of claim 1, wherein preparing a policy comprises:
   setting an upper limit on an amount of bandwidth allocated to a group of said servers; and
   setting a lower threshold for an amount of bandwidth to be used by said group of servers.

5. The method of claim 4, further comprising applying said limit and threshold at ports of a storage device of said storage area network.

6. The method of claim 4, further comprising applying said limit and threshold at a logical unit of a storage device of said storage area network.

7. The method of claim 4, wherein, if I/O requests for a group of servers drop below the corresponding lower threshold, the upper limit for another group of servers is released.

8. The method of claim 1, wherein said preparing a policy comprises receiving user input to establish said groups and access parameters.

9. The method of claim 1, further comprising assigning servers to said groups based on I/O performance requirements for said servers.

10. The method of claim 9, wherein each server in one of said groups receives a same bandwidth allocation setting as other servers in that group.

11. The method of claim 1, wherein said preparing said policy further comprises varying said access parameters with time.

12. Computer-readable instructions stored on a medium for storing computer-readable instructions, said instructions, when executed by a resource manager in a storage area network (SAN), causing said resource manager to allocate network bandwidth in the SAN according to a policy that defines access parameters for two or more groups of host computers that are grouped according to priority in accessing network resources so one group of host computers with a higher priority preferentially receives bandwidth in the SAN as compared to another group of host computers with a lower priority.

13. The instructions of claim 12, wherein said instructions further cause said resource manager to:
   receive a plurality of Input/Output (I/O) requests from a plurality of host computers;
   determine a priority group to which each of said host computers belong; and
   dynamically allocate bandwidth resources to said host computer based on the priority group to which that host computer belongs.

14. The instructions of claim 12, wherein said instructions further cause said resource manager to, in accordance with said policy:
   set an upper limit on an amount of bandwidth allocated to a group of said host computers; and
   set a lower threshold for an amount of bandwidth to be used by said group of host computers.

15. The instructions of claim 14, wherein said instructions further cause said resource manager to apply said limit and threshold at ports of a storage device of said storage area network.

16. The instructions of claim 14, wherein said instructions further cause said resource manager to apply said limit and threshold at a logical unit of a storage device of said storage area network.

17. The instructions of claim 14, wherein said instructions further cause said resource manager to release a corresponding upper limit for one group of host computers if I/O requests from another group of host computers drop below the corresponding lower threshold.

18. The instructions of claim 11, wherein said instructions further cause said resource manager to vary allocations of network bandwidth to said groups of host computers as a function of time in accordance with said policy.

19. A system for managing bandwidth allocation in a storage area network (SAN), the system comprising:
   means for preparing a policy that defines access parameters for two or more groups of servers that are grouped according to priority in accessing network resources; and
   means for implementing said policy so a first group of servers with a first priority preferentially receives bandwidth for processing Input/Output (I/O) requests in the SAN as compared to a second group of servers with a second priority that is lower than the first priority.

20. The system of claim 19, wherein said means for implementing said policy comprise a resource manager for controlling access to said network resources in response to said policy.

21. The system of claim 19, wherein said means for implementing said policy comprise:
- means for receiving a plurality of Input/Output (I/O) requests from a plurality of servers;
- means for determining a priority group to which each of said servers belong; and
- means for dynamically allocating bandwidth resources to said server based on the priority group to which that server belongs.

22. The system of claim 19, wherein said means for implementing said policy comprise:
- means for setting an upper limit on an amount of bandwidth allocated to a group of said servers in accordance with said policy; and
- means for setting a lower threshold for an amount of bandwidth to be used by said group of servers in accordance with said policy.

23. The system of claim 22, further comprising means for applying said limit and threshold at ports of a storage device of said storage area network.

24. The system of claim 22, further comprising means for applying said limit and threshold at a logical unit of a storage device of said storage area network.

25. The system of claim 22, further comprising means for releasing the corresponding upper limit for a group of servers if I/O requests from another group of servers drop below the corresponding lower threshold.

26. The system of claim 19, further comprising user input means for receiving user input to establish said policy.

27. The system of claim 19, further comprising means for assigning servers to said groups based on I/O performance requirements for said servers.

28. The system of claim 19, wherein said means for implementing said policy further comprise means for varying said access parameters as a function of time in accordance with said policy.

29. A storage area network (SAN) comprising:
- a plurality of servers divided into priority groups;
- at least one storage device networked to said plurality of servers; and
- a resource manager for allocating access to at least one storage device by said servers in accordance with a policy that defines access parameters for each of said priority groups so a first group of servers with a first priority preferentially receives bandwidth for processing Input/Output (I/O) requests in the SAN as compared to a second group of servers with a second priority that is lower than the first priority.

30. The network of claim 29, wherein said policy further comprises:
- an upper limit on an amount of bandwidth allocated to a group of said servers; and
- a lower threshold for an amount of bandwidth to be used by said group of servers.

31. The network of claim 30, wherein said resource manager applies said limit and threshold at ports of a storage device of said storage area network.

32. The network of claim 30, wherein said resource manager applies said limit and threshold at a logical unit of a storage device of said storage area network.

33. The network of claim 30, wherein said resource manager releases a corresponding upper limit for a group of servers if Input/Output requests from another group of servers drop below the corresponding lower threshold.

34. The network of claim 29, further comprising a user interface through which a user can establish or update said policy.

35. The network of claim 29, wherein said resource manager varies allocations of access to at least one storage device for said groups of servers as a function of time in accordance with said policy.

36. A resource manager for a storage device in a storage area network (SAN), said resource manager comprising:
- a policy that defines access parameters for two or more priority groups of host computers in the storage area network; and
- computer readable instructions, stored in a computer readable medium accessible to said resource manager, for execution by said resource manager, that allocates access to a storage device of the storage area network by the host computers in accordance with said access parameters of said policy so one group of host computers with a higher priority preferentially receives bandwidth in the SAN as compared to another group of host computers with a lower priority.

* * * * *